United States Patent Office 3,563,703
Patented Feb. 16, 1971

3,563,703
PROCESS FOR TREATING PHOSPHATE ROCK
Ernest C. Camp, Jr., College Park, Ga., assignor to Cities Service Company, New York, N.Y., a corporation of Delaware
No Drawing. Filed Apr. 29, 1968, Ser. No. 725,139
Int. Cl. C01b 25/22; C01f 11/38
U.S. Cl. 23—165          11 Claims

ABSTRACT OF THE DISCLOSURE

This is an improved process for producing phosphoric acid from natural phosphate rock by acidulating the rock with from about 75 to 85% by weight nitric acid, and thereafter precipitating anhydrous calcium nitrate from the acidulate. In general, the anhydrous calcium nitrate is precipitated by increasing the content of nitric acid in the acidulate. When employing this two-step process, a phosphoric acid solution is obtained which is easily separated from the anhydrous calcium nitrate, and is readily converted to a highly water soluble mixer fertilizer having a high plant food analysis.

BACKGROUND OF THE INVENTION

This invention relates to a process for producing a phosphoric acid solution from phosphate rock. In particular, it relates to an improved process for producing phosphoric acid by nitric acid acidulation.

Many techniques have been considered for the production of phosphoric acid or a phosphate concentrate from phosphate rock. Most notable among such techniques is the so-called Wet Process employing sulfuric acid to digest the rock. This technique is the most widely used in industry to date. A process involving the use of nitric acid for acidulation has also been investigated and is used to a limited extent commercially. Recently the demand for sulfur has far exceeded the dwindling supplies so that other methods such as the nitric acid method are of increasing importance. Thus, it is desirable to achieve a process, not involving sulfuric acid, that will be as economical and also overcome some of its inherent disadvantages.

As is well known, the production of phosphoric acid is highly desirable to the fertilizer industry since it is readily utilizable, by neutralization with various bases, to produce mixed fertilizers of high plant food analysis. Even with the long-standing experience of the commercial sulfuric acid and nitric acid processes, deficiencies still exist and it is highly desirable to be able to more efficiently produce a phosphoric acid solution which will more readily form fertilizing materials exhibiting greater water solubilty and plant food analysis than heretofore obtainable by practical means.

Previous attempts at processing phosphate rock with nitric acid have left much to be desired in meeting the requirements of the fertilizer industry. By way of specific but illustrative example, the prior nitric acid acidulation processes have involved digesting phosphate rock with low concentrations of nitric acid which, while producing marketable yields of phosphoric acid solution, still leave excessive calcium in the system and require uneconomical processing equipment and techniques. Further, previously known processes have resulted in excessive quantities of water insoluble calcium phosphates thereby decreasing the yield of phosphoric acid or usable phosphorous values for fertilizer purposes. Additionally, previous processes have produced calcium nitrate by-product in the less desirable hydrated form. The prior art has used various means for removing the calcium nitrate from the acidulate such as refrigeration or the addition of various salts. However, no practical and economical method for removing adequate quantities of the calcium nitrate from the system has been found producing a phosphoric acid solution which, upon neutralization, results in a highly water soluble fertilizer.

Accordingly, there exists an urgent need for a simple, direct and economical method for processing phosphate rock into a phosphatic concentrate capable of forming a highly water soluble fertilizer upon further processing, free of the side effects and deficiencies of the prior art.

SUMMARY OF THE INVENTION

It is primary object of this invention to provide an improved process for producing phosphoric acid, especially phosphoric acid solutions or phosphatic concentrates, from phosphate rock.

It is another object to provide an improved process for producing phosphoric acid solutions by the nitric acid acidulation of phosphate rock.

It is still a further object to provide an improved process for directly producing a phosphoric acid solution which, upon the usual processing such as neutralization, results in a more water soluble mixed fertilizer having a higher plant food analysis.

In addition it is an object to provide a process for producing a more valuable phosphoric acid solution and valuable anhydrous calcium nitrate by-product by the nitric acid acidulation of phosphate rock.

Other aspects, objects and advantages of this invention will be evident as the discussion proceeds.

The above and other objects of this invention are achieved by digesting phosphate rock with at least sufficient 75 to 85% by weight concentrated nitric acid to convert the phosphate rock to an acidulate comprising phosphoric acid and calcium nitrate, in solution, and thereafter precipitating anhydrous calcium nitrate from the acidulate.

During the digestion, it is particularly advantageous to employ about an 80% by weight nitric acid concentration. The temperature of the digestion reaction is preferably the equilibrium temperature normally achieved by the reaction of the nitric acid with the phosphate rock. For best results, the rock should be pre-crushed to a particle size so that it will pass through a 30 Tyler mesh screen.

Subsequent to digesting the phosphate rock as aforedescribed, the calcium nitrate is precipitated from the resulting acidulate in its anhydrous form. This step is best, and preferably, performed by increasing the nitric acid content of the acidulate. The increase in the nitric acid content of the acidulate can be achieved either by adding a more concentrated nitric acid solution to the acidulate or, preferably, by forming nitric acid in situ, for example by introducing a nitrogen oxide and oxygen into the resulting acidulate, preferably under pressure. During the precipitation step, the temperature employed is preferably that achieved by the precipitation reaction mix.

The increase in nitric acid concentration should also be such that, upon precipitation of the calcium nitrate, no more than about 14% by weight of water remains in the resulting supernatant solution.

The supernatant liquid is recovered by conventional means. If desired, the phosphoric acid can be recovered from the supernatant liquid as superphosphoric acid or the supernatant liquid can be employed, if necessary after removal of undesired excess nitric acid, to directly produce mixed fertilizers of high water solubility and high plant food analysis by conventional means.

By the unique two-step process briefly described above and more elaborately presented hereinafter, many advantageous results are achieved. By way of example, a phosphoric acid solution (phosphatic concentrate) is produced which, when converted to a fertilizer mix, is at least 90% and generally at least 95% soluble in water, a feature which has not been readily achievable by the prior art processes. Another feature of the invention is that both steps can be conducted at equilibrium temperature conditions, thus simplifying the economics and obviating the need for complex equipment and processing employed heretofore. For example, there is no need to employ refrigerating equipment or the addition of salts or the like such as used in present nitric acid acidulation processes. Another advantage is that, rather than having to employ high grade phosphate rock as presently required, low grade phosphate rock can be employed while still producing a product from which a high analysis mixed fertilizer having a greater water solubility can be produced. Still further, complications normally attendant by gangue formation in the prior art process are minimized and in many cases obviated. An even further advantage of the invention is that anhydrous calcium nitrate is produced and recovered rather than the hydrated calcium nitrate as is produced by the prior art techniques. The anhydrous calcium nitrate produced by the present invention, is of such a high yield, readily at least 90% and most generally over 95%, and of such a high purity that it can be used as obtained; for example, for low quality fertilizer purposes, for decomposition to produce nitrogen oxides which are, in turn, useful for production of nitric acid, or other well known uses of calcium nitrate. These and other advantages of the novel process will be apparent as the discussion proceeds.

DESCRIPTION OF PREFERRED EMBODIMENTS

In the digestion step it is necessary to employ from about 75 to 85% by weight concentrated nitric acid. Digesting with lower concentrations of nitric acid causes more gangue formation owing to less oxidation of organic impurities and also hinders the precipitation of the anhydrous calcium nitrate from the acidulate in the next step to an extent that adequate removal is impractical. Digesting with concentrations of nitric acid higher than about 85% proceeds very slowly, and results in losses of phosphoric acid on the order of at least 9%. For best results, 80 to 85% by weight, more especially about 80% by weight, concentrated nitric acid is employed.

In the digestion step, the temperature of the reaction mix should be from about 160 to 240° F. While temperatures not within this range can be employed, it has been found that below about 160° F., among other disadvantages, the digestion proceeds too slow for practical operation. Beyond about 240° F., no particular advantage in yield of phosphoric acid is obtained. In addition, the resulting corrosive qualities of the system require prohibitive preventive measures. It is particularly preferable to digest the phosphate rock at the equilibrium reaction temperature of the reacting mixture. The equilibrium temperature usually ranges from about 180° F. to 220° F. No heat control is necessary if digestion is carried on at the equilibrium reaction temperature. Further, more organic impurities are oxidized at equilibrium temperatures, than at lower temperatures, so that less foam is evolved during digestion.

Generally, unground or any size phosphate rock may be utilized for digestion, but it is preferred to crush the rock to a size such that it will pass through about a 16 Tyler Mesh screen. For best results, it is preferred to crush the rock to a size passing through about a 30 Tyler Mesh screen.

While the time of reaction is influenced somewhat by the rock size and temperature, reaction times of 1 to 2 hours are preferred when operating according to this invention.

At least sufficient nitric acid to convert the phosphate rock to calcium nitrate and phosphoric acid is employed to digest the rock. The amount of nitric acid employed to digest the rock is based on the amount of calcium in the rock. It is preferred to add an excess, over the theoretical, of nitric acid, usually no more than about 15% by weight, and preferably from 10 to 15%, based on the calcium present, calculated as CaO. If more excess acid is added, no additional benefit is observed in terms of phosphate recovered by the process. When employing a 10 to 15% excess amount of nitric acid, this results in an acidulation ratio of from about 2.5 to 2.6 parts by weight nitric acid per part calcium calculated as CaO.

As previously indicated the calcium nitrate is precipitated from the acidulate obtained as described above in its anhydrous form. The precipitation of calcium nitrate in the anhydrous form is best, and preferably, accomplished by increasing the nitric acid content or concentration of the acidulate. It will be apparent that various means can be employed to increase the nitric acid content of the acidulate, included among which are the addition of a more concentrated solution of nitric acid to the acidulate or the formation of additional nitric acid in situ via the introduction of nitrogen oxides and oxygen into the acidulate.

In that embodiment wherein pre-formed and higher concentration nitric acid is added to the acidulate, the nitric acid should be at least 90% by weight concentrated. It is preferred, however, that the nitric acid be at least 95% and, more especially, at least 98% by weight concentrated (hereinafter referred to as essentially anhydrous nitric acid). Such preformed nitric acid is employed in amounts between about 0.5 to 2.5 parts per part of phosphate rock initially acidulated.

In the alternative, but especially preferred, embodiment, the content of nitric acid in the acidulate is increased by introducing one or more nitrogen oxides (preferably the nitrogen oxides recycled and resulting from decomposition of calcium nitrate by-product) and oxygen, including air, into the acidulate at appropriate conditions to form nitric acid in situ with the water present in the acidulate. In forming the nitric acid in situ, generally, a pressure between 100 to 500 p.s.i.g. should be maintained for best results. Generally, from between about 0.75 and about 1.20 parts of nitrogen oxides (as $N_2O_5$) per part phosphate rock initially used is employed to form nitric acid in situ, the specific amount depending somewhat upon the grade of rock employed and the specific concentration of nitric acid used to digest the rock.

Regardless of what mode of operation is employed for increasing the nitric acid content in the acidulate, the temperature employed during the precipitation of the anhydrous calcium nitrate can be varied. It has been found, however, the best results are obtained when the equilibrium temperature of the precipitation mix is employed, e.g. from 160° F. to 190° F.

Further improvement is obtained when the water content of the calcium nitrate precipitation system is such that, after precipitation of the calcium nitrate, no more than 14% water is present in the supernatant solution regardless of whether the nitric acid content is increased by the addition of a more concentrated, pre-formed nitric acid solution or forming nitric acid in situ in the precipitation reaction mix.

Some advantage is achieved by recycling a slurry of anhydrous calcium nitrate obtained from a previous precipitation step into the acidulate obtained from the digestion step in order to provide anhydrous calcium nitrate particles as nuclei for particle growth.

Generally speaking, the precipitation of the anhydrous calcium nitrate is essentially instantaneous. Upon completion of the precipitation, the solid and liquid phases can be separated by conventional means, e.g. decanting, filtration or, preferably, centrifugation. Such separation is readily achieved since the liquid phase is of a low viscosity and the anhydrous calcium nitrate crystals will settle rapidly.

While the precipitation reaction mix can be retained for a considerable period of time prior to separation, it is preferable to perform separation operations within a period of about one to two hours after precipitation.

Subsequent to separation, it is preferred that the anhydrous calcium nitrate cake be washed with between about 75 to 85, more especially about 80, percent by weight concentrated nitric acid, in order to recover any adsorbed phosphorus values. While varying amounts of such nitric acid wash solution can be employed, it is preferred that at least one part per part of anhydrous calcium nitrate be employed. It is likewise desirable to employ such nitric acid wash solution at a temperature of 70 to 100° F. in order to minimize the re-solution of calcium nitrate from the filtrate cake. The wash acid can, of course, be employed in the digestion step if desired.

The supernatant liquid remaining after removal of the precipitated anhydrous calcium nitrate can be employed as such in the usual applications of forming mixed fertilizers. For example, upon removal of nitric acid and/or water, if desired, the supernatant liquid can be reacted with bases, such as ammonia or potassium hydroxide, to produce mixed fertilizers which have an exceptionally high water solubility and plant food analysis. On the other hand, the supernatant phosphoric acid solution can be subjected to purification techniques in order to recover essentially pure phosphoric acid.

The following examples are given to further illustrate the nature of the invention and are not limitative of scope.

EXAMPLE I

In order to determine the effect of varying the concentration of nitric acid employed to digest phosphate rock, said change being reflected in the amount of phosphate recovered, as compared to the theoretical amount present in phosphate rock, phosphate rock of about 30% $P_2O_5$ [corresponding to about 66% $Ca_3(PO_4)_2$], and 47% by weight calcium measured as CaO was digested after being crushed to a particle size passing through a 30 Tyler Mesh screen. About 2.74 parts nitric acid per part calcium, calculated as CaO, was used to digest the rock.

After the phosphate rock had been digested for an hour, the calcium nitrate was precipitated in its anhydrous form from the liquid acidulate by adding 2 parts of essentially anhydrous nitric acid (97.2% $HNO_3$, 2% $NO_2$, 0.6% $H_2O$) per part rock initially used. The precipitate was separated from the liquid solution by centrifugation and the resulting phosphoric acid solution was analyzed for phosphoric acid content, as $P_2O_5$. The following table illustrates the results obtained.

ACIDULATION OF PHOSPHATE ROCK WITH NITRIC ACID

| Concentration of nitric acid employed for digestion | Temperature during digestion, °F. | $P_2O_5$ removed based on theoretical $P_2O_5$ in rock, percent |
|---|---|---|
| 75 | 240 | 97 |
| 80 | 240 | 97 |
| 85 | 240 | 86 |

The above and other data illustrate that about 80% concentrated nitric acid will produce the highest yields of phosphoric acid.

EXAMPLE II

To demonstrate the effects of temperature, phosphate rock was acidulated, anhydrous calcium nitrate precipitated, and phosphate recovered, employing the procedure essentially as described in Example I with exception that 80% concentrated nitric acid was employed for digestion of the rock at the indicated temperature. Also the digestion was performed for about 2 hours. The following table shows the results obtained in recovery of phosphate material at varying temperatures.

| Temperature of acidulate in °F.: | $P_2O_5$ recovered based on theoretical $P_2O_5$ in rock, percent |
|---|---|
| 160 | 97 |
| 180 | 95 |
| 210 | 96 |
| 240 | 97 |

EXAMPLE III

In order to illustrate the effects of rock size on the process, 80% nitric acid was employed to digest phosphate rock according to the procedure of Example I. The temperature during digestion was 240° F. and 160° F.

EFFECT OF ROCK SIZE

| Particles passing through Tyler mesh of— | Percent $P_2O_5$ recovered based on theoretical $P_2O_5$ rock at 240° F. | 160° F. |
|---|---|---|
| Unground | | 38.6 |
| 6 Mesh | 88.9 | 62.8 |
| 10 Mesh | 84.4 | 67.0 |
| 16 Mesh | 93.6 | 77.8 |
| 20 Mesh | 93.9 | 94.0 |
| 30 Mesh | 95.5 | 96.6 |
| 60 Mesh | | 97.2 |

From the results it is seen that crushing rock to a size passing through 30 Tyler Mesh screen produces a uniquely high recovery of phosphate value.

EXAMPLE IV

In order to further demonstrate the effectiveness of this process, four batch experiments were performed. In each experiment, one hundred parts of the phosphate rock employed in Example I were digested with 80 weight percent concentrated nitric acid at a rate of 2.70 parts $HNO_3$ per part calcium calculated as CaO. The 80% nitric acid adds about 33 parts of free water to the system. Otherwise the procedure of Example I was followed essentially as described.

The following table illustrates the relationship of anhydrous calcium nitrate removed from solution to the weight percent of free water in solution after precipitation.

In each experiment, increasing amounts of the anhydrous nitric acid were added to the acidulate to precipitate the anhydrous calcium nitrate.

| Experiments | 1 | 2 | 3 | 4 |
|---|---|---|---|---|
| Parts of $NHO_3$ added per part Ca $(NO_3)_2$ | 0.38 | 0.77 | 1.15 | 1.54 |
| Parts of nitric acid added | 52.5 | 105.0 | 157.5 | 210.0 |
| Parts of acidulate before addition of nitric acid | 261.0 | 261.0 | 261.0 | 261.0 |
| Total parts | 313.5 | 366.0 | 418.5 | 471.0 |
| Parts of anhydrous calcuim nitrate precipitated | 104.6 | 123.9 | 129.4 | 135.6 |
| Parts of solution after precipitation of nitric acid | 208.9 | 242.1 | 289.1 | 335.4 |
| Percentage of free water in supernatant solution, percent | 15.9 | 13.7 | 11.5 | 9.9 |
| Percentage of original calcium removed from solution, percent | 76 | 90 | 94 | 98.5 |

The results of this experiment demonstrate that in precipitating anhydrous calcium nitrate from a phosphate rock acidulate, by increasing the quantity of nitric acid in the system, sufficient nitric acid must be present in the acidulate to reduce the percentage of free water in solution to less than about 14 weight percent and preferably below 10 weight percent. When such calcium removal is achieved, a phosphoric acid solution (or phosphatic fertilizer concentrate) is obtained which can be converted to an essentially completely water soluble fertilizer, e.g. by ammoniation. The calcium (as (CaO)), to phosphate $P_2O_5$ ratio in the system wherein 98.5% CaO has been removed, is about 1 to 17. The supernatant solution is essentially concentrated nitric and phosphoric acids. On evaporation of nitric acid, essentially pure phosphoric acid is produced.

EXAMPLE V

To demonstrate the precipitation of anhydrous calcium nitrate by forming nitric acid in situ, a 10% excess of 80% by weight nitric acid was employed to digest the phosphate rock of Example I. One hundred parts of the resulting acidulate, which contained 13.02% phosphoric acid (as $P_2O_5$) and 19.49% calcium nitrate (as CaO), were sealed in an autoclave. The autoclave temperature was adjusted to about 160° F. Next, 39 parts of nitrogen dioxide were added and thereafter oxygen gas was introduced to furnish a pressure of 100 pounds per square inch gauge. Additional oxygen was added as needed to maintain this pressure.

The precipitation reaction was complete in 15 minutes and oxygen pressure was maintained for a further 15 minutes, though no pressure drop was observed which would indicate further reaction. After depressuring the system and filtering the anhydrous calcium nitrate cake, the liquid phase showed, on analysis, 16.98% phosphoric acid (as $P_2O_5$) and only 1.18% calcium nitrate (as CaO), or a ratio of 14 to 1. The low ratio of calcium in the phosphatic concentrate makes it especially suitable for processing by neutralization to a highly water soluble mixed fertilizer.

EXAMPLE VI

Employing the procedure of Example V, 100 parts of nitric acid acidulate containing 13% ($P_2O_5$) and 17.58% (as CaO) were reacted with 129 parts of nitrogen dioxide and oxygen. The filtrate obtained analyzed 9.61% ($P_2O_5$) and 0.4% (CaO) a ratio of 24 to 1. The production of $P_2O_5$ was 98.8% of theoretical.

The higher degree (over 97% calcium removed) of purity of the filtrate, allows further processing of the solution to a mixed fertilizer of higher water solubility.

The above examples illustrate various specific embodiments of the process. When the above examples are repeated employing the conditions, proportions and other variations discussed herein, similar results are obtained. It is to be understood that modifications can be made. For example, the anhydrous calcium nitrate can be precipitated from the acidulate employing a combination of both pre-formed and in situ-formed nitric acid. Still further, the wash solution resulting from washing the filtered anhydrous calcium nitrate can be employed in the process. For example, at the designated concentrations, it, along with make up acid, can be used as digestion acid. The wash solution can also be employed in the precipitation step either by further concentrating to a higher nitric acid content or by combining with make-up nitric acid. It will also be evident that the wash solution can be reacted with nitrogen oxides and oxygen to produce additional nitric acid in situ.

The anhydrous calcium nitrate by-product can be used for various known purposes or it can be decomposed at elevated temperatures, producing nitrogen oxides and oxygen. The nitrogen oxides and oxygen can then be reacted with water to form nitric acid, either separately or in situ; for example, in the precipitation reaction mix. Still further, any nitric acid that is recovered from the phosphoric acid solution or elsewhere in the processing can, of course, be used in either forming the digestion acid or the precipitation acid. It will also be evident that the process of this invention can be conducted either by batch or continuous techniques employing single or multiple reactors for the digestion step and/or the precipitation step.

The phosphoric acid solution resulting from separation of the anhydrous calcium nitrate can be employed for many uses. It is particularly useful for neutralization reactions with bases, especially ammonia and phosphate rock, to produce fertilizer mixes. Nitric acid contained in the phosphoric acid solution can be removed to any desired extent in order to adjust the final composition of the fertilizer mix. In all cases, however, the resulting fertilizer mix is at least 90 percent soluble in water and most generally at least 95 percent soluble in water. Numerous fertilizer mixes have been prepared employing the phosphoric acid solution obtained by the present process. By way of example, fertilizer mixes resulting from ammoniation typically are formed with at least 2:1 and more generally 3:1 phosphoric acid anhydride to nitrogen ratios, having the aforementioned water solubility characteristics.

Still further, mixed fertilizers can be obtained readily from the phosphoric acid solution resulting from practicing the process of this invention without removal of any of the nitric acid by reacting the phosphoric acid solution directly wtih metal salts such as alkali metal halides and, preferably, potassium chloride. Usually the alkali metal halide is employed in an amount of at least 2 moles per mole of phosphoric acid contained in the phosphoric acid solution. During the reaction of the alkali halide for example, potassium chloride, with the phosphoric acid solution, chlorine and nitrogen oxides are produced which can be readily separated and reused as discussed above. Generally, any unreacted nitric acid is removed from the alkali halide and phosphoric acid solution reaction mixture and the residue is preferably heated at a temperature of about 740° C. for about thirty minutes. Again the resulting mixed fertilizer is essentially completely soluble in water and has an exceptionally high plant food analysis. A particular feature among others, in employing the phosphoric acid solution produced by this invention for reaction with the alkali halide as described herein is that highly toxic and corrosive nitrosyl halide normally produced by prior art techniques are minimized.

Having thus described the process of this invention, it is not intended to be limited except as set forth in the following claims.

Therefore, I claim:

1. In a method for producing a phosphoric acid solution by digesting phosphate rock with nitric acid, the improvement which comprises:
   (a) digesting the phosphate rock with at least sufficient 75% to 85% by weight concentrated nitric acid to convert the phosphate rock to an acidulate comprising calcium nitrate and phosphoric acid;
   (b) thereafter increasing the nitric acid concentration of the acidulate until the free water content of the solution is less than about 14 percent by weight, whereby anhydrous calcium nitrate precipitates from the acidulate; and recovering the phosphoric acid solution.

2. The method of claim 1 wherein the resultant supernatant solution obtained after precipitation of the calcium nitrate is characterized by a water content of no more than 10% by weight water.

3. The method of claim 1 in which the anhydrous calcium nitrate is precipitated by adding at least 90% by weight concentrated nitric acid.

4. The method of claim 3 in which the quantity of nitric acid added to the acidulate to precipitate anhydrous calcium nitrate is from about 0.5 to 2.5 parts by weight nitric acid per part phosphate rock initially acidulated.

5. The method of claim 4 in which nitric acid from about 80 to 85% by weight concentration is employed to digest the phosphate rock and at least 95% by weight concentrated nitric acid is thereafter added to the acidulate to increase the quantity of nitric acid therein.

6. The method of claim 5 in which the temperature employed during digestion is the equilibrium temperature of the reaction mix.

7. The method of claim 6 in which the phosphate rock is reduced to a particle size capable of passing through a number 30 Tyler Mesh screen prior to digestion.

8. The method of claim 7 in which about 80% by weight concentrated nitric acid is employed to digest the phosphate rock and from about 98 to 100% by weight concentrated nitric acid is thereafter added to the acidulate to increase the quantity of nitric acid therein.

9. The method of claim 1 in which the quantity of nitric acid is increased in the acidulate by introducing a nitrogen oxide and oxygen into the acidulate, whereby the nitric acid is formed in situ.

10. The method of claim 9 in which the pressure of the system is maintained at least at about 100 pounds per square inch.

11. In a method for producing a phosphoric acid solution by digesting phosphate rock with nitric acid, the improvement which comprises:

(a) digestion phosphate rock having a particle size smaller than 16 Tyler Mesh with a 10% to 15% excess of 75% to 85% concentrated nitric acid, said excess being based on the amount of calcium, calculated as the oxide, present in said rock, at a temperature of from 160° to 240° F. to convert the phosphate rock to an acidulate comprising calcium nitrate, phosphoric acid and excess nitric acid, (b) thereafter increasing the nitric acid concentration of the acidulate until the free water content of the solution is less than about 14% by weight, and (c) recovering a phosphoric acid solution characterized by a greatly reduced calcium content.

References Cited
UNITED STATES PATENTS

| | | | |
|---|---|---|---|
| 1,816,285 | 7/1931 | Johnson | 71—58X |
| 1,903,636 | 4/1933 | Smith | 23—102 |
| 2,609,271 | 9/1952 | Plusje | 23—102 |
| 2,713,534 | 7/1955 | Constant | 71—39X |

OSCAR R. VERTIZ, Primary Examiner

G. O. PETERS, Assistant Examiner

U.S. Cl. X.R.

23—102